United States Patent
Corona Galvan et al.

(10) Patent No.: US 9,238,765 B2
(45) Date of Patent: Jan. 19, 2016

(54) HYDROGENATED ALKENYL AROMATIC-DIENE COPOLYMERS CONTAINING COMONOMERS HAVING SILYL HYDRIDE UNITS AND THEIR FUNCTIONALIZED ANALOGS

(75) Inventors: Sergio Corona Galvan, Madrid (ES); Diana Martinez Wichtel, Madrid (ES); Luis Serrano Aviles, Madrid (ES); Montserrat Fernandez Munoz, Madrid (ES); Roderic P. Quirk, Akron, OH (US); Vijay Chavan, Akron, OH (US); Jonathan Janoski, Akron, OH (US)

(73) Assignees: DYNASOL ELASTOMEROS, S.A., Madrid (ES); THE UNIVERSITY OF AKRON, Akron, OH (US)

( * ) Notice: Subject to any disclaimer, the term of this patent is extended or adjusted under 35 U.S.C. 154(b) by 0 days.

(21) Appl. No.: 14/380,932

(22) PCT Filed: Feb. 29, 2012

(86) PCT No.: PCT/ES2012/070130
§ 371 (c)(1), (2), (4) Date: Aug. 25, 2014

(87) PCT Pub. No.: WO2013/128041
PCT Pub. Date: Sep. 6, 2013

(65) Prior Publication Data
US 2015/0175854 A1 Jun. 25, 2015

(51) Int. Cl.
| | | |
|---|---|---|
| C08L 19/02 | (2006.01) | |
| C09J 153/00 | (2006.01) | |
| C08C 19/02 | (2006.01) | |
| C08C 19/25 | (2006.01) | |
| C08C 19/44 | (2006.01) | |
| C08F 293/00 | (2006.01) | |
| C08F 297/04 | (2006.01) | |
| C09D 153/00 | (2006.01) | |

(52) U.S. Cl.
CPC ............. *C09J 153/005* (2013.01); *C08C 19/02* (2013.01); *C08C 19/25* (2013.01); *C08C 19/44* (2013.01); *C08F 293/005* (2013.01); *C08F 297/04* (2013.01); *C09D 153/005* (2013.01)

(58) Field of Classification Search
CPC ........ C08C 19/02; C08C 19/25; C08C 19/44; C09J 153/005; C08F 297/04; C08F 293/005; C09D 153/005
See application file for complete search history.

(56) References Cited

U.S. PATENT DOCUMENTS

| 5,266,644 A | 11/1993 | Riffle et al. |
| 2005/0148727 A1 | 7/2005 | Ajbani et al. |
| 2008/0171653 A1 | 7/2008 | Chen et al. |
| 2010/0137525 A1 | 6/2010 | Chen et al. |

FOREIGN PATENT DOCUMENTS

| CN | 1086522 A | 5/1994 |
| JP | 2000-336239 A | 12/2000 |
| JP | 2004-346140 A | 12/2004 |
| WO | 0043447 A1 | 7/2000 |

OTHER PUBLICATIONS

Iwasa, T., et al., "Thermoplastic elastomer composition for weather strips and building materials is prepared by heating mixture containing ehylene-alpha-olefin-unconjugated diene copolymer rubber, propylene polymer and silicone compound", "WPI Accession No. 2000-548738", Jul. 27, 2000, pp. 1-4.

Shibahara, S., et al., "Thermoplastic elastomer composition, comprising optionally hydrogenated styrene block copolymer, olefin resin, hydrogenpolysiloxane and hydrosilylation catalyst, useful as molding material", "WPI Accession No. 2001-248096", Dec. 5, 2000, pp. 1-2.

Hattori, I., et al., "Modified conjugated diene group polymer for thermoplastic elastomer composition, is obtained by performing hydro silylation and/or hyrogenation of conjugated diene group polymer, by using compounds having silicon-hydrogen bond(s)", "WPI Accession No. 2005-060672", Dec. 9, 2004, pp. 1-4.

*Primary Examiner* — Nathan M Nutter
(74) *Attorney, Agent, or Firm* — Hultquist, PLLC; Steven J. Hultquist

(57) ABSTRACT

The present invention relates primarily to polymers comprising at least one alkenyl aromatic monomer, at least one conjugated diene monomer, and at least one monomer containing silyl hydride moieties, characterized in that said polymers are hydrogenated and preferably functionalized by hydrosilylation reactions between the silyl hydride groups on the polymer chain and the multiple bonds of any alkene or alkyne compound. Besides the described products, this invention comprises their synthesis processes and their uses, especially as thermofusible adhesives, in plastics impact modification, and in chain-extension reactions to obtain new materials, among others.

15 Claims, No Drawings

HYDROGENATED ALKENYL AROMATIC-DIENE COPOLYMERS CONTAINING COMONOMERS HAVING SILYL HYDRIDE UNITS AND THEIR FUNCTIONALIZED ANALOGS

CROSS-REFERENCE TO RELATED APPLICATION

This application is a U.S. national phase under the provisions of 35 U.S.C. §371 of International Patent Application No. PCT/ES12/70130 filed Feb. 29, 2012. The disclosure of such international patent application is hereby incorporated herein by reference in its respective entirety, for all purposes.

FIELD OF THE INVENTION

The present invention relates to hydrogenated alkenyl aromatic-diene copolymers containing comonomers having silyl hydride units and their functionalized analogs obtained by means of hydrosilylation reactions as well as the corresponding synthesis processes and their uses, especially as thermofusible adhesives, in plastics impact modification, and in chain-extension reactions to obtain new materials, among others.

STATE OF THE ART

Polymers containing conjugated diene and vinyl aromatic groups, such as triblock or penta-block copolymers of styrene-butadiene or styrene-isoprene, have already been commercialized in many applications, for example, adhesives, shoe soles, and polymer modification.

Further, there is high commercial interest in having polymers with in-chain and chain-end functional groups. Their usefulness resides in the ability of these functional groups to participate in reactions such as reversible ionic association; chain extension, chain branching, or crosslinking with polyfunctional reagents; and coupling or linking with reactive groups. Some important applications of these polymers can be foreseen such as for modifying the impact properties of engineering plastics, to get new segmented block copolymers, to modify surface properties, etc.

There exist several methods to obtain functionalized polymers. Among them, the methodology of terminating living polymers, especially living alkyllithium initiated polymers, is perhaps the most useful. However, direct treatment of polymeric organolithium compounds with electrophilic reagents often gives incomplete functionalization and side products. Moreover, this methodology is limited by the necessity to develop, optimize and characterize the functionalization reactions and products for each different functional group (Anionic Polymerization: Principles and Practical Applications", Hsieh, H. L., Quirk, Roderic P., Marcel Dekker Inc, New York, 1996, page 262). Development of better ways to functionalize polymers is therefore essential.

The use of functionalized initiators in living anionic polymerizations is another method to obtain chain-end functionalized polymers. Lithium containing initiators such as dimethylaminopropyllithium or (3-(t-butyldimethylsiloxy)propyl)lithium have been described (U.S. Pat. No. 5,552,753; U.S. Pat. No. 6,197,891). The functional groups provided by these kind of initiators are not stable under anionic polymerization conditions; therefore they are protected with other groups that are stable during polymerization. In order to obtain the functionalized polymer, a final deprotection step is necessary. The obvious disadvantage of this methodology is the necessity of effecting additional protection and deprotection reactions.

Both the use of functionalized initiators, and the termination of living polymers with functional groups, permit the incorporation of a limited number of functional groups in each polymer molecule, namely at the initial and/or the final ends.

In this context, the presence of chain-end functional groups can affect the surface and interfacial properties of polymers (Lo Verso, F., Likos, C. N., Polymer, 2008, 49, 1425-1434). However, to change bulk physical properties of polymers, or to incorporate a higher density of functional groups, they have to be incorporated into the repeating units along the polymer chain (in-chain functionalization).

Few efficient methods are known to date to obtain in-chain functionalized polymers. In-chain functionalized commercial polymers have been typically made by reactive extrusion. One of the most used in-chain functionalized polymers are maleated polystyrene-block-poly(ethylene-co-butylene)-block-polystyrene (SEBS), which are typically obtained by melt extrusion of the SEBS with maleic anhydride in the presence of a free radical initiator. This method is not efficient, since side reactions such as chain-crosslinking and chain scission reactions are frequent during the process, and polymers are commonly contaminated with free maleic anhydride. Maleic anhydride is a serious health-risk for human contact, and very efficient apparatus or washing processes are needed to remove it, which dramatically increases the cost of these products (U.S. Pat. No. 4,578,429). Some problems regarding the use of radical initiators to incorporate functional groups on polymers are the difficulty to control the amount and location of the functional groups in the polymer chain, as well as the secondary crosslinking and scission reactions that could degrade the polymer backbone.

Another way to synthesize in-chain functionalized polymers is by use of functionalized monomers in anionic polymerizations. A major problem with respect to this approach is that one must prepare a new monomer for each new functional group. Further, many important functional groups are not stable to organolithium compounds. Therefore, it is often necessary to protect these functional groups with suitable protecting groups that are stable during the polymerization. This methodology has the drawback that the protective groups have then to be removed by costly and sometimes inefficient post-polymerization deprotection reactions. Even when these monomers are equipped with protected functional groups, they can only be polymerized in a controlled manner to form well-defined polymers, generally at −78° C. and in THF (Nakahama, S.; Hirao, A. Prog. Polym. Sci. 1990, 15, 299). In summary, these procedures involving new monomers for each functional group have the obvious disadvantages of having two additional steps in comparison to common polymerization processes: the introduction of a protecting group in the monomer and the necessity of effecting a deprotection step, as well as the low reaction temperature/polar solvent requirements. These conditions are not economically feasible for commercial processes since commercial anionic polymerizations are generally effected at room temperature or above, in hydrocarbon solvents, and without having to use costly, time-consuming and inefficient post-polymerization steps.

Chain-end functionalized polystyrenes have been prepared via a two-step method of functionalization. The first step involved treatment of active polymeric anions of polystyrene with chlorodimethylsilane to yield polymers functionalized with silyl hydride at the chain-end. These were then treated with various alkenes via hydrosilylation reactions to obtain chain-end functionalized polystyrenes. Using this method many different kinds of functional groups such as amine, fluoro, and others were incorporated in the polymer chain ends in quantitative yields (Quirk, R. P., Kim, H., Chowdhury, S. R., Polym. Prepr. Am. Chem. Soc., Div. Polym Chem., 2005, 46(2), 583-584) (Quirk, R. P., Kim, H., Polce, M. J., Wesdemiotis, C., Macromolecules, 2005, 38, 7895-7906)

This functionalization methodology has been found to also be applicable to the synthesis of cyano substituted functionalized polystyrenes from the reaction of poly(styryl)lithium with dichloromethylsilane and subsequent hydrosilylation with allyl cyanide (Quirk, R. P., Janoski, J., Chowdhury, S. R., Wesdemiotis, C., Dabney, D. E., Macromolecules, 2009, 42, 494-501).

Both methodologies of polystyrene functionalization permit the incorporation of only one functional group at different positions in each polymer molecule.

Quirk and co-workers synthesized a linear triblock copolymer composed of styrene and (4-vinylphenyl)dimethylsilane in the first block, isoprene in the middle block, and styrene and (4-vinylphenyl)dimethylsilane again in the last block. The synthesis was done by anionic polymerization under high-vacuum using sec-butillithium as initiator in benzene at room temperature, obtaining a thermoplastic elastomer (TPE) that exhibited properties similar to those of a regular TPE (S. R. Chowdhury, Ph.D. Thesis, The University of Akron, 2006). More recently, poly[(4-vinylphenyl)dimethylsilane]-b-polybutadiene-b-poly[(4-vinylphenyl)-dimethylsilane] block copolymers have been synthesized using high vacuum techniques and a dilithium initiator in benzene at room temperature (Hong Wei Ma, Bai Wang, Chun Qing Zhang, Yang Li, Yan Ming Hu, Yu Rong Wang, Chin. Chem. Lett., vol 22, 1371-1374, 2011).

The products obtained by this method contain olefinic double bonds in their structures, which are prone to cracking due to heat or oxidation if exposed to ultraviolet light or other unfavorable environments, and thus become unstable and not useful for certain applications (EP2289951).

Therefore, there is still the need to develop new polymers with functional groups or able to be functionalized, preferably along the polymer chain, and that at the same time show a good thermo-oxidative stability, required for example for flexible materials, biomedical materials, etc.

BRIEF DESCRIPTION OF THE INVENTION

The inventors of the present invention have developed polymers with improved thermo-oxidative stability and having silyl hydride moieties along the polymer chain which can be subjected to hydrosilylation reactions with one or more substrates having alkene and/or alkyne moieties and preferably at least one functional group, so that in-chain functionalized polymers can be obtained with a plethora of functional groups.

Thus, the present invention provides a general method to introduce in a controlled way a plethora of functionalities along the polymer chain (in-chain functionalization), in the desired amount, in the desired site or position, and of the desired type, in alkenyl aromatic-diene copolymers containing comonomers having silyl hydride units, said copolymers being hydrogenated. Moreover, according to some variants of the invention, the polymer may be also provided with chain-end functionalization.

In a first aspect, the present invention refers to a polymer (herein also referred by simplicity as "hydrogenated in-chain functionalized polymer of the invention") obtainable by a process which comprises the following steps:

a) polymerization of at least one alkenyl aromatic monomer, at least one conjugated diene monomer, and at least one monomer containing at least one silyl hydride moiety;

b) hydrogenation of the original dienic unsaturations of the polymer obtained in the previous step; and c) functionalization of some or all of the silyl hydride moieties available with one or more substrates having alkene or alkyne moieties via a hydrosilylation reaction in the presence of a catalyst;

wherein the functionalization step c) is carried out either after or before the hydrogenation step b).

Advantageously, all the steps (polymer synthesis, polymer hydrogenation, and polymer functionalization by hydrosilylation) may be effected sequentially in solution in the same reactor.

In a second aspect, the present invention refers to a polymer (herein also referred by simplicity as "hydrogenated polymer having in-chain silyl hydride moieties of the invention") obtainable by a process which comprises the following steps:

a) polymerization of at least one alkenyl aromatic monomer, at least one conjugated diene monomer, and at least one monomer containing at least one silyl hydride moiety; and b) hydrogenation of the original dienic unsaturations of the polymer obtained in the previous step.

The processes for the preparation of these polymers as well as the corresponding uses represent additional aspects of the present invention.

These aspects and preferred embodiments thereof are additionally also defined hereinafter in the detailed description and in the claims.

DETAILED DESCRIPTION OF THE INVENTION

In the context of the present invention, the following terms have the meaning detailed below.

As used herein, the term "about" means a slight variation of the value specified, preferably within 10 percent of the value specified. Nevertheless, the term "about" can mean a higher tolerance of variation depending on for instance the experimental technique used. Said variations of a specified value are understood by a person skilled in the art and are within the context of the present invention. Further, to provide a more concise description, some of the quantitative expressions given herein are not qualified with the term "about". It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value.

In the present invention the molecular weights of the polymers disclosed relate to the molecular weight in the distribution peak, $M_p$.

The terms "units" and "moieties" are often used interchangeably herein.

Polymerization [(Step a)]

Those persons skilled in the art will readily appreciate that the polymers of the present invention may be prepared by a variety of polymerization techniques from the corresponding monomers, said monomers comprising at least one alkenyl aromatic monomer, at least one conjugated diene monomer, and at least one monomer containing at least one silyl hydride moiety.

In a preferred embodiment of the invention, the monomers to be polymerized comprise at least one alkenyl aromatic monomer, at least one conjugated diene monomer, and at least one monomer containing at least one silyl hydride moiety, being such monomers different from each other. In an alternative embodiment, the monomer containing at least one silyl hydride moiety and the alkenyl aromatic monomer are the same (i.e. at least one alkenyl aromatic monomer to be polymerized contains at least one silyl hydride moiety). In another alternative embodiment, the monomer containing at least one silyl hydride moiety and the conjugated diene monomer are the same (i.e. at least one conjugated diene monomer to be polymerized contains at least one silyl hydride moiety).

Examples of alkenyl aromatic monomers useful in the present invention include, but are not limited to: styrene, vinylpyridine (such as 2-vinylpyridine, 4-vinylpyridine), vinylnaphthalene (such as 1-vinylnaphthalene, 2-vinylnaphthalene), 1,2-diphenyl-4-methylhexene and mixtures of them. The alkenyl aromatic monomers may be optionally substituted with one or more substituents selected from the group consisting of alkyl, cycloalkyl, aryl, and alkylaryl. Further, the alkenyl aromatic monomers may also optionally contain at least a Si—C bond, at least a Si—O—C bond, at least a Si—O—Si bond, at least a Si—N bond and/or at least a Si—Si bond. The total number of carbon atoms in the combined constituents of the alkenyl aromatic monomer is preferably at most 18.

Representative examples of substituted alkenyl aromatic monomers include: alpha-methylstyrene, vinyltoluene, 3-methylstyrene, 3,5-diethylstyrene, 2-ethyl-4-benzylstyrene, 4-phenylstyrene, 4-p-tolylstyrene, 4-(tert-butyl)-styrene, 2,4-divinyltoluene, 1-alpha-methylvinylnaphthalene, 2-alpha-methylvinylnaphthalene, and 4,5-dimethyl-1-vinylnaphthalene, and mixtures thereof.

Other alkenyl aromatic monomers of interest in the present invention are styrenes containing Si—C bonds, like 4-(trimethylsilyl)styrene or 4-(vinyldimethylsilyl)-styrene, styrenes with Si—O—C bonds, like 4-(dimethylmethoxysilyl)styrene, styrenes with Si—O—Si bonds like 4-[(trimethylsilyloxy)dimethylsilyl]styrene, styrenes with Si—N bonds like 4-[(N,N-diethylamino)-dimethylsilyl]styrene, and styrenes with Si—Si bonds like 4-(allyldimethylsilyl)dimethylsilylmethylstyrene, In a preferred embodiment, at least one alkenyl aromatic monomer is styrene (S).

Conjugated diolefins (or dienes) appropriate for their use in the preparation of the polymers of the invention are known in the state of the art and include, but are not limited to: 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and myrcene, and their mixtures.

In a preferred embodiment, at least one conjugated diene monomer is selected from butadiene (B) and/or isoprene (I)

The polymers of the present invention also comprise at least one monomer containing at least one silyl hydride moiety (i.e. Si—H bond). The use of monomers of this type in the polymerization provides the polymers with in-chain silyl hydride units, entities that are useful for further reactions to introduce a wide variety of useful functional groups into the polymer chains.

In a particular embodiment, the monomer containing silyl hydride moieties is selected from an alkenyl aromatic monomer having silyl hydride units. Examples of alkenyl aromatic monomers having silyl hydride units appropriate in the present invention include, but not limited to, dialkylsilylstyrenes [such as 2-, 3- and 4-(dimethylsilyl)styrene, 2-, 3- and 4-(diethylsilyl)styrene, 4-(diisopropylsilyl)styrene] and dialkylsilylalkylstyrenes [such as 2-, 3- and 4-(dimethylsilyl)methylstyrene, 2-, 3- and 4-(dimethylsilyl)ethylstyrene, 4-(diethylsilyl)methyl styrene, 4-(diethylsilyl)ethylstyrene, 4-(diisopropylsilyl)methylstyrene, 4-(diisopropylsilyl)ethylstyrene], dialkyl(prop-1-en-2-ylphenyl)silanes [such as dimethyl(4-(prop-1-en-2-yl)phenyl)silane, diethyl(4-(prop-1-en-2-yl)phenyl)silane, diisopropyl(4-(prop-1-en-2-yl)phenyl)silane], (tert-butyl-vinylphenyl)dimethylsilanes, and the like.

Also of interest for this invention are dienes having silyl hydride units, i.e. Si—H bonds. One particular example of diene monomer having silyl hydride units is 1,3-butadien-1-yldimethyl-silane.

Other silyl-substituted monomers of interest and importance to this invention include dialkylvinylsilanes, silyl-substituted acrylates and methacrylates, cyclic siloxanes and related compounds.

In a preferred embodiment, at least one monomer containing at least one silyl hydride moiety is 4-dimethylsilylstyrene (DMSiS).

Apart from the three types of monomer mentioned above (i.e. at least one alkenyl aromatic monomer, at least one conjugated diene monomer, and at least one monomer containing silyl hydride moieties), the polymers according to the present invention may include other monomers such as acrylamides, acrylonitriles, nitrobutene, vinyl isocyanates, anhydrides, methacrylates, acrylates, carbodiimides, lactones, lactams, cyclic siloxanes and ethylene.

The different monomers forming part of the polymers of the invention may be located in any monomer sequence (block, tapered or random, or a combination thereof).

In a more preferred embodiment, the alkenyl aromatic monomer is styrene (S), the conjugated diene monomer is butadiene (B) and/or isoprene (I), and the monomer containing silyl hydride moieties is 4-dimethylsilylstyrene (DMSiS), polymerized in any order in block, random and/or tapered sequences, and with linear, radial, comb or grafted structures. Examples of these elastomers and thermoplastic elastomers include the block copolymers S-DMSiS-B, S-DMSiS-I, (S-DMSiS-B)$_m$S (wherein m is a whole number), S-DMSiS-B-S, S-DMSiS-I-S, B-S-DMSiS-B, I-S-DMSiS-I, and copolymers in which at least one of the blocks has a random or tapered structure such as (S/DMSiS)-B, (S/DMSiS)-I, (S/DMSiS-B)$_m$S (wherein m is a whole number), (S/DMSiS)-B-S, (S/DMSiS)-I-S.

According to a particular embodiment, the diene part in the polymer obtained in the polymerization reaction has an approximate content of 8% to 80% molar of 1,2 structures.

According to another particular embodiment, the molar proportion of the alkenyl aromatic monomer with respect to the conjugated diene monomer preferably ranges from about 0.1 to about 1.0, more preferably from about 0.2 to about 0.5 and even more preferably from about 0.2 to about 0.4.

According to another particular embodiment, the molar proportion of the silyl hydride containing monomer with respect to the conjugated diene monomer preferably ranges from about 0.1 to about 1.0, more preferably from about 0.2 to about 0.5 and even more preferably from about 0.2 to about 0.3.

According to another particular embodiment, the molar proportion of alkenyl aromatic monomer and silyl hydride containing monomer with respect to conjugated diene monomer ranges from about 0.05 to about 1.0.

Polymerization techniques that can be used in the context of the present invention include, without limitation, anionic polymerization, free radical polymerization, metathesis ring-opening polymerization, ring-opening polymerization of heterocycles, coordination polymerization (e.g. Ziegler-Natta and related polymerizations) and condensation polymerizations.

According to the present invention, it is preferred to carry out the polymerization reaction by anionic polymerization. Anionic polymerization is a well-known technique which uses initiators, such as organic initiators of alkali metals, to polymerize conjugated diolefins or other anionically polymerizable monomers. The polymers produced by anionic polymerization are commonly called "living polymers", due to the fact that in the initiation step, each initiator molecule creates a carbanion, allowing the polymer to continue growing until the monomers have been totally consumed. The polymers remain active even after the monomers have been exhausted, and they will continue reacting and growing if additional monomer is supplied. A detailed description of the methodology can be found in "Anionic Polymerization: Principles and Practical Applications", Hsieh, H. L., Quirk, Roderic P., Marcel Dekker Inc, New York, 1996, pp 93-120, which is incorporated in the present application as reference. Anionic polymerization is a methodology particularly attractive for the production of block copolymers with well-defined structures. The polymers obtained by this route may be radial, linear or branched polymers, depending on the functionalities of the initiators or linking agents used to prepared them.

Anionic polymerization is typically carried out in non-polar hydrocarbon solvents (such as hexane, cyclohexane or heptane), usually at moderate temperatures (for instance, about 50° C.-60° C.), preferably under vacuum and/or inert atmosphere, and using purified reagents in order to avoid the premature termination of the initiator or polymerized chains. Anionic polymerization can be carried out in a continuous process, by batches or semicontinuous.

In a preferred embodiment, the initiators used to obtain the polymers of this invention by anionic polymerization are common alkyllithium initiators.

The living/active polymer is usually treated with an electrophilic reagent. Different termination reactions are known for the skilled person and in the context of the invention include, without limitation, depending on the electrophilic reagent, the following variants:

treatment of the living polymer with a terminating agent such as an alcohol (propanol, phenol, etc.) to deactivate the polymerization;
  treatment of the living polymer with a linking agent such as silicon tetrachloride, to form a branched polymer;
  treatment of the living polymer with a chain end terminating agent or linking agent, said agents comprising or being able to provide functionalization. For example, treatment of the living polymer with a chlorosilane type reagent so that a polymer provided with Si—H moieties at the chain-ends is obtained. Said Si—H moieties in turn could react through hydrosilylation reactions with substrates having double and triple bonds and contain preferably at least one functional group.

Therefore, the polymers of the invention might optionally be functionalized also at the omega end by subjecting the polymeric organolithium to end-functionalization with electrophilic reagents.

The molecular weights of the polymers of the invention can be adjusted depending on requirements and varying the quantity of polymerized monomers but normally have a molecular weight in the distribution peak, Mp, from about 1,000 g/mol to about 1,000,000 g/mol. Preferably, the Mp of the polymer ranges from about 5,000 g/mol to about 500,000 g/mol, and more preferably between 20,000 and 400,000 g/mol.

The molecular weight of the polymers synthesized by anionic polymerization in the present invention is conveniently measured by a Gel Permeation Chromatography (GPC) apparatus, which has been calculated using the universal calibration curve method. The calibration is carried out with polymers of known molecular weight and they must have the same molecular structure and the same composition as the polymers to be characterized have. The polymers synthesized by anionic polymerization are essentially monodisperse (the average molecular weight quotient in weight/average molecular weight in number is close to one), being appropriate to report the molecular weight in the distribution peak, Mp, as the molecular weight of the polymer. Likewise, the molecular weight of the star-shaped polymers prepared by anionic polymerization corresponds to the molecular weight in the distribution peak of the linked chains. The determination of the degree of linking of the branched polymers, i.e. determination of the number of covalently bonded arms to the star-shaped polymer, is established by relating the molecular weight of the star-shaped polymer in the distribution peak with that of the molecular weight of the arm in the distribution peak.

Hydrogenation [(Step b)]

The polymers disclosed in the present invention are hydrogenated. In addition to having the advantages described previously, the hydrogenated polymers provide the materials with thermal, oxidative, hydrolytic and ultraviolet radiation stability, essential for applications that require high thermal stability or where the materials are exposed to damp environments or to the atmosphere.

In a first aspect, the present invention refers to a hydrogenated polymer having in-chain silyl hydride moieties, obtainable by a process which comprises a polymerization step a) and a hydrogenation step b), as previously defined.

In a second aspect, the present invention refers to a hydrogenated in-chain functionalized polymer, obtainable by a process which comprises a polymerization step a), a hydrogenation step b) and a hydrosilylation step c), as previously defined. Preferably, the hydrosilylation step c) is carried out after the hydrogenation step b).

As it will be appreciated the hydrogenated polymer having in-chain silyl hydride moieties of the invention, apart from serving as an intermediate for the hydrogenated in-chain functionalized polymer of the invention, is a useful material by itself.

Examples of hydrogenation catalysts and processes useful for the present invention are disclosed in patents, U.S. Pat. No. 5,393,843, U.S. Pat. No. 5,583,185, WO 09952918, EP 0885905 and WO 2010149812.

Hydrogenation of the polymer having in-chain silyl hydride moieties can be performed in situ in the reaction medium (where the polymerization took place or where the polymerization and the hydrosilylation took place, if the hydrosilylation step is carried out before the hydrogenation). The reaction medium for these steps can be for instance hexane, cyclohexane or heptane. For example, the solution is placed in contact with hydrogen gas in presence of a catalyst, such as a nickel or a titanium catalyst. According to a particular embodiment, the hydrogenation is carried out in solution of polymers in the presence of homogeneous catalysts which contain, as essential component, a titanium compound of the type $(CpR^1)(CpR^2)Ti(PhOR)_2$, where Cp is a cyclopentadienyl group, Ph is a phenyl group, OR is an alkoxide group containing 1 to 4 carbon atoms, and $R^1$ and $R^2$ are independently selected from H and $C_3$-$C_{10}$ alkyl. The hydrogenation is typically carried out at temperatures of about 25° C. to about 150° C., with a typical hydrogen pressure of about 0.5 atm to about 20 atm.

The hydrogenation process may be monitored by different analytical techniques such as Infrared spectroscopy (IR) or Nuclear Magnetic Resonance (NMR). According to a particular embodiment, at least 50% of the original dienic unsaturations of the polymer are hydrogenated, preferably more than 85%, more preferably more than 95%. According to another particular embodiment, less than 1% of the aromatic units are hydrogenated.

In a preferred embodiment, the alkenyl aromatic monomer is styrene (S), the conjugated diene monomer is butadiene (B) and/or isoprene (I), and the monomer containing silyl hydride moieties is 4-dimethylsilylstyrene (DMSiS) in the polymer which is subjected to hydrogenation. Examples of these elastomers and thermoplastic elastomers include the hydrogenated counterparts of the following block copolymers S-DMSiS-B, S-DMSiS-I, (S-DMSiS-B)$_m$,S (wherein m is a whole), S-DMSiS-B-S, S-DMSiS-I-S, B-S-DMSiS-B, I-S-DMSiS-I, for example S-DMSiS-EB-S, S-DMSiS-EB, S-DMSiS-EP and others. According to another embodiment, examples of these elastomers and thermoplastic elastomers include the hydrogenated counterparts of the following copolymers in which at least one of the blocks has a random or tapered structure such as (S/DMSiS)-B, (S/DMSiS)-I, (S/DMSiS-B)$_m$,S (wherein m is a whole number), (S/DMSiS)-B-S, (S/DMSiS)-I-S, for example (S/DMSiS)-EB-S, (S/DMSiS)-EB-(S/DMSiS), (S/DMSiS)-EP-S and others.

Functionalization [(Step c)]

Hydrosilylation reactions are defined as the addition of the silyl hydride group across a carbon-carbon double or triple bond giving rise to new Si—C and C—H bonds, as exemplified with a Pt(0) catalyst in Equation 1.

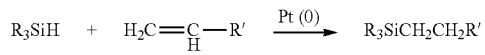

Equation 1.—Hydrosilylation Reaction of Silyl Hydride Compounds with Vinyl Compounds These reactions can be effected using many catalysts, but the most commonly used and efficient catalysts are transition metal catalysts (Marcienec, B. Hydrosilylation, A Comprehensive Review on Recent Advances; Springer 2009, pages 8-17). A number of different transition metals can be used to catalyze hydrosilylation reactions and their order of activity is Pt>Rh>Ir=Ru>Os>Pd. The most commonly used platinum-based hydrosilylation catalysts are Speier's catalyst ($H_2PtCl_6$) and Karstedt's catalyst ($Pt\{[Me_2(vinyl)Si]_2O\}_{1,5}$).

The polymers having in-chain silyl hydride units of this invention are attractive materials because they have hydrosilyl groups which can undergo further reactions. The silicon-hydrogen bond can add to carbon-carbon multiple bonds in alkenes and alkynes, resulting in the formation of new silicon-carbon bonds. A plethora of specialty functionalities may be introduced in the polymers having in-chain silyl hydride groups by hydrosilylation. Further, graft copolymers may be synthesized by the reactions of the polymers having in-chain silyl hydride groups with polymers having C═C and/or C≡C bonds. This technology can form specialty polymers with improved properties, especially better processability combined with improved reactivity, polarity and the like.

Enhanced physical properties as well as polymer compatibility and polarity are important characteristics of the resulting in-chain functionalized polymers, which give them advantages over non-functionalized polymers or over chain-end functionalized polymers. Additionally, surface activity can be modified (high or low surface energy), making them useful in applications where one wants to improve adhesion, miscibility, dispersibility or control of wettability. For example, in-chain, perfluoroalkyl substituted polymers have unique characteristic properties including low surface free energy, low friction coefficient, low dielectric constant, excellent flame resistance, and both solvent and chemical resistance. When the in-chain functionalized polymers of the present invention are mixed with non-functionalized polymers, the functional groups of different nature to the non-functionalized polymers could locate selectively to the surface of the mixture, thus modifying their surface properties even with small amounts of the in-chain functionalized polymers.

Notably, in the processes described herein the functional groups are introduced in a post-polymerization step, so that there is no need to protect them to avoid interference with the anionic growing chains during the anionic polymerization process. Thus, one advantage of this invention with respect to the prior art, e.g. the use of functional monomers, is that it eliminates two typical steps in the functionalization processes during anionic polymerization: the protection of the functional groups before polymerization and their deprotection after polymerization.

A further advantage of this invention is that it provides the possibility of introducing any type of functionality or functionalities. Moreover, once a given polymer having in-chain silyl hydride moieties has been synthesized, it can be used to prepare by hydrosilylation different polymers containing different in-chain functional groups and consequently different physical and chemical properties, whereas the basic polymer structure (comonomer content and distribution, architecture, molecular weight and molecular weight distribution) is unchanged.

As noted previously, the hydrosilylation step c) is preferably carried out after the hydrogenation step b). This provides a further advantage of this invention, since hydrogenation of functionalized products is crucial to confer them with the thermo-oxidative stability properties desired for certain applications. However, it is known that certain functional groups such as those with a polar nature can deactivate the hydrogenation catalyst. Hence, the hydrogenation of functionalized polymers depends to some extent on the nature of the functional groups involved. By means of the preferred process described in this invention, any functional group independently of its nature can be incorporated in any position along the polymer chain that exhibits enhanced stability properties.

It should be understood that the hydrosilylation reaction takes place with substrates having alkene or alkyne moieties which preferably contain at least one functional group, and for this reason, the hydrosilylation is often referred to as a functionalization reaction.

The in-chain functionalized polymers of this invention are obtained by the hydrosilylation reaction of polymers having silyl hydride groups along the chain. This in-chain functionalization is effected by reacting the silyl hydride with alkynes or alkenes having functional groups in the presence of certain catalysts. This hydrosilylation reaction can be effected in the same reaction system where the polymerization process and/ or the hydrogenation have been made, or in another place, like in an extruder or other mixing apparatus.

The hydrosilylation reactions encompassed by this invention proceed under conditions under which most functional groups are stable and they can be carried out conveniently in the hydrocarbon solvents and conditions used in commercial anionic processes. In a preferred embodiment, the hydrosilylation process is effected in solution, preferably in the same reactor and solvent where the polymerization and/or the hydrogenation step have been effected, typically at a temperature between about 25° C. and about 250° C., preferably between about 40° C. and about 200° C., more preferably between about 40° C. and about 150° C.

According to another embodiment, the hydrosilylation reaction of the in-chain silyl hydride-containing polymers can be effected by reactive extrusion by adding the substrate(s) having alkene or alkyne moieties and the catalyst to the molten polymer obtained in the hydrogenation step b), typically at a temperature between 130 and 280° C., preferably between about 150° C. and about 250° C., more preferably between about 180° C. and about 220° C. (U.S. Pat. No. 6,114,445).

The hydrosilylation may be catalyzed radically, ionically or with metal complexes (i.e. transition metal catalysts) as described in the literature (U.S. Pat. No. 6,114,445). In a preferred embodiment, the catalyst is selected from a transition metal catalyst, more preferably from a platinum, rhodium or palladium-based catalyst. In a more preferred embodiment, the catalyst is selected from a platinum-base catalyst and even more preferably it is selected from the Speier's catalyst ($H_2PtCl_6$) and the Karstedt's catalyst ($Pt\{[Me_2(vinyl)Si]_2O\}_{1.5}$). Typically, the amount of catalyst to silyl hydride containing monomer in the polymer ranges from about 0.0001 to about 0.10 g/g, preferably in the range of about 0.001 to about 0.05 g/g.

In a especially preferred embodiment, the in-chain silyl hydride containing polymer is subjected to hydrosilylation reaction with one or more substrates having alkene or alkyne moieties which comprise independently each other one or more functional groups selected from: acrylate, alkoxy, alkyl alkoxy, alkenyl aromatic, halogen, hydroxyl, carbonyl, aldehyde, haloformyl, carboxy, carboxylate, ester, ketone, hydroperoxy, peroxy, ether, acetal, amine, ammonium, imine, imide, cyanate, cyanohydrin, isocyanate, nitrate, nitrile, nitro, pyridyl, sulfide, disulfide, sulfinyl, phosphate, epoxy, methacrylate, methyl methacrylate and its derivatives.

Preferably, the substrate(s) having alkene or alkyne moieties are added in molar ratio to in-chain silyl hydride groups of about 0.1 to about 5, preferably in the molar range of about 0.5 to about 3 and more preferably in the molar range of about 1 to about 2.

Uses and Applications

The present invention is not only limited to new polymers and their synthesis processes, but also includes compositions and uses and applications thereof. In this context, both the hydrogenated polymers having in-chain silyl hydride moieties and the hydrogenated in-chain functionalized polymers according to the present invention can undergo further reactions (the Si—H moieties may react by hydrosilylation reactions and the functionalities present in the polymer may react with complementary functional groups) so that they are advantageous as intermediates for other polymers/materials. Further, both types of polymers may be useful materials by themselves. In particular, the possibility of introducing in a controlled way a plethora of functionalities along the polymer chain makes the hydrogenated in-chain functionalized polymers of the present invention suitable for a multitude of applications. Another aspect of this invention is the preparation of new segmented, branched, comb or graft materials by reacting:

the in-chain containing silyl hydride polymers of this invention with one or more polymers having C=C and/or C≡C bonds through an hydrosilylation reaction; or the in-chain functionalized polymers of this invention with complementary functional groups present in other monomers, polymers or substrates. One example is the preparation of segmented, comb or graft copolymers by the condensation reaction of polyurethanes having free isocyanate groups with in-chain functionalized polymers having hydroxyl functionalities.

Another aspect is the use of the polymers object of this invention to effect chain extension reactions, effected by the condensation reaction of chemicals having complementary groups with the functional groups present in the polymers of this invention.

The silyl hydride containing polymers and the in-chain functionalized polymers of the first and second aspects can be used in adhesive compositions. The adhesive compositions might be a hot-melt adhesive, a solvent borne adhesive or a reactive adhesive (in which ingredients able to react with the in-chain functionalities of the polymers are added purposely) also encompassing light, UV and radiation curing compositions.

In case of the hot-melt adhesive, the functional groups present in the in-chain functionalized polymer might interact with the resin and with the substrate, improving compatibility with the resin and interaction with the substrate, giving adhesives with improved tack, peel resistance and shear resistance. The interaction with the substrate might be improved by hydrogen bonding formation or by specific interactions of the functional groups in the polymer with the substrate. The same behaviour might be expected when in-chain functionalized polymers are added into solvent born adhesives.

The hot melt adhesive composition may contain at least one additive selected from the group that consists of tackifying resins, stabilizers, plasticizers and antioxidants. In some of these applications, from about 15 to 30, and more preferably from about 18 to 25, parts by weight of the in-chain containing silyl hydride polymer or of the in-chain functionalized polymer object of this invention are mixed with other components of conventional adhesive formulation, such a tackifiers, stabilizers, plasticizers and antioxidants, to give these adhesive compositions improved properties compared with the adhesives prepared with the same composition, using the same type of polymer without the introduction of the functional groups. Examples of suitable tackifiers include resins with high and low softening points, which are compatible with the polymer. These include hydrogenated resins, colophony esters, polyterpene resins, terpene phenolic resins, and coumarone-indene resins. In some illustrative modalities, the quantity of resins in the composition ranges from about 45 to 65% by weight. The plasticizers, generally known as extender oils, include mineral oils, paraffin oils and naphthenic oils. In some illustrative modalities, the quantity of plasticizer in the composition ranges from about 15 to 30% by weight. The antioxidants are commonly added to the adhesive composition in quantities from about 0.05 to 3% by weight. The examples of antioxidants include phenolic compounds, and thio compounds. In a preferred embodiment the composition comprises from about 15 to 30% by weight of tackifying resin, from about 15 to 30% by weight of plasticizer and from about 0.05 to 2% by weight of antioxidant. In a preferred embodiment, the adhesive compositions can be used in multiple applications, for example in adhesives for packaging, labels and adhesive tapes, construction and as pressure-sensitive adhesives to be used in manufacturing disposable elastic articles.

In case of the reactive adhesive, it is sought that the in-chain functionalized polymer is equipped with functional groups able to react or to be activated by light, radiation or UV light. One example of this is epoxide functionality, which is introduced into the polymer chain by effecting the hydrosilylation reaction of the silyl hydride groups attached into the polymer chain with epoxyhexene. The functional groups of the polymer of this invention placed in the adhesive formulation might react in this way with the substrate or with another chemical present in the adhesive formulation like in two pot adhesives.

Additionally, if the adhesive composition contains the silyl hydride containing polymer, chemical reactions of this by the methods described in the functionalization step of this invention might be effected, i.e. hydrosilylation. This will led to obtain specialty adhesives where special functional groups are introduced as needed to improve the interaction with the substrate or with the ingredients of the adhesive.

Another aspect of the present invention is a sealant composition which contains the polymers of the invention.

Another aspect of the present invention is a coating composition, in which the polymers of this invention help to adhere to the substrate and/or make the surfaces to be coated either preferably more hydrophobic or hydrophilic, depending on the functional groups attached to the polymers.

Furthermore, the polymers of the present invention are useful for reinforcing materials or to prepare composite materials, which means that these polymers can be mixed with a reinforcing material or with the material that is going to be reinforced. The materials which are going to be reinforced can be preferably selected from the group that consists of asphalts, adhesives, plastics, tyres and nanomaterials. Good results have been obtained when plastics selected from polyamides, polyurethanes, polyethers, polysulfones, polyether ketones, polyether ether ketones, polyetherimides, polycarbonates, polyesters, polystyrene and copolymers of them are reinforced. The reinforced material or compound is useful for the production of articles and can be for example an extruded article, an injection-moulded article, a compression-moulded article or a tyre.

Another aspect is a modified asphalt which comprises asphalt mixed with the polymers of the invention. The asphalts may contain from about 1 to 25% by weight of the polymer based on the total weight of the asphalt and of polymer. Preferably, the modified asphalt contains from about 5 to 20% by weight of the polymer. These asphaltic mixtures modified with the polymers of this invention can be used in applications such as roads, asphalt membranes and the like. Notably, the functional groups or the silyl hydride groups present in the polymer of this invention, once incorporated into the asphalt blend, might react further with other groups present in the asphalt to obtain asphalt blends with improved properties.

Another aspect of the present invention is directed to a modified material which comprises a mixture of the polymers of this invention and a plastic of any nature, more preferable an engineering plastic. The polymers of the invention may be added to improve the physical properties, in particular resistance to impact, with respect to the virgin plastic. The mixture typically contains from about 1 to 90% by weight of the polymer, based on the total weight of the mixture, preferably from about 1 to 40% by weight. According to one embodiment, the plastic preferably contains at least one polymer that is selected from the group that consists of polystyrene, polybutadiene, polyisoprene and random copolymers, in block or progressive, prepared from monomers selected from the group that consists of styrene, butadiene and isoprene, and which preferably have an average molecular weight in the distribution peak of about 3,000 to 300,000 g/mol. A great variety of engineering plastics can be mixed, but preferably the engineering plastic is selected from the group that consists of polyamides, polyurethanes, polyethers, polysulfones, polyether ketones, polyether ether ketones, polyimides, polyetherimides, polycarbonates, polyesters, polystyrene and copolymers of them. The polymer of the present invention preferably contains polystyrene for its mixture in plastics.

The polymers of the present invention are useful to obtain fibers, prepared preferably by electrospinning or any other known method. Depending on the functionality possessed by the in-chain functionalized polymer, fibers of polymer with hydrophilic or hydrophobic surfaces are to be obtained. Of special interest are hydrophobic surfaces, which are water repellent and self-cleaning. Fluorine groups, in general, are known to impart hydrophobicity due to their low surface energy. These fibers of polymer can be used advantageously in applications to obtain specialty clothing, surgical threads and the like.

The polymers of the present invention are also useful to prepare organic or inorganic nanomaterials with improved properties, given the high possibility of interaction, both physical or chemical, of the functional groups present in the polymers of this invention with complementary functional groups present in the nanoparticle.

The polymers of the invention are also useful in medical applications, such as in the fabrication of medical tubing, particularly by incorporating biocompatible functional groups into the polymer chain.

The polymers of the present invention are also useful to prepare compositions for cable applications, where a thermoplastic elastomer (TPE) derived from the functionalized polymers of the invention are added to a formulation which is subsequently crosslinked to obtain a fire-resistant halogen free cable useful as insulator in the electrical or automotive sectors.

The polymers of the present invention are also useful to prepare tie layer compositions; where the functional groups incorporated on the functionalized polymers enhance compatibility and adhesion between the surfaces of layers of different materials.

The polymers of the present invention are also useful in overmoulding compositions with polymers conventionally used in such application.

In additional preferred embodiments of the present invention, the preferences and particular embodiments described above are combined. The present invention is also directed to such combinations of preferences and particular embodiments.

Throughout the description and claims the word "comprises" and its variants do not aim to exclude other technical characteristics, additives, components or steps. For persons skilled in the art, other objects, advantages and characteristics of the invention shall be gathered in part from the description and in part from practice of the invention.

The following examples are provided by way of illustration and do not aim to be limitative of the present invention.

EXAMPLES

All the polymerizations and hydrogenations in the following examples were performed in autoclave reactors with an inner capacity of 2 Liters, provided with a control system for temperature, stirring, and flow-meters in the monomer addition lines, as well as nitrogen and hydrogen inlets, venting and sampling lines.

The polymers obtained were characterized by gel permeation chromatography and $^1$H NMR technique in $CDCl_3$ at 500 mHz.

Example 1

Block Copolymer of 4-Dimethylsilylstyrene with Styrene and Butadiene with 4-Dimethylsilylstyrene in the First Block (DMSiS/S)-b-BD-b-S 1130 mL of cyclohexane were introduced to the polymerization reactor, together with 2.8 mL of tetrahydrofurane and 20.1 grams of styrene and 1 mL of pure 4-dimethylsilylstyrene. The initial reaction temperature was set to 60° C., and 2.1 mmol of n-butyllithium in a cyclohexane solution were added. The monomer mixture was allowed to react under those conditions during 5 minutes. After that, 151 mL (1.75 mol) of 1,3-butadiene were added. The reaction of butadiene was left to polymerize during 25 minutes. Finally, 20.4 grams of styrene were added in a cyclohexane solution. Reaction time of the final polystyrene block was 5 minutes, and the appropriate amount of di-tert-butyl-methylphenol (BHT), determined by the on line UV-Vis technique, was added to deactivate the living polymer chains. A sample of the polymer solution in cyclohexane was precipitated in hot water, and the resulting polymer was dried under vacuum at 80° C. over 12 hours and analyzed: The solid obtained presented a Mp of 100.366 in the GPC and a PDI of 1.31. The composition of the product calculated from the $^1$H-NMR spectrum was 0.6% wt 4-dimethylsilylstyrene units, and 30% wt styrene units. The styrenic block content (styrene and dimethylsilylstyrene) was 97% with respect to the total styrenic units in the copolymer, and the vinyl content was 32% with respect to the total butadiene. These results indicate a quantitative 4-dimethylsilylstyrene incorporation to the polymer, as well as triblock structure formation.

Example 2

Block Copolymer of 4-Dimethylsilylstyrene with Styrene and Butadiene with 4-Dimethylsilylstyrene in the Last Block S-b-BD-b-(S/DMSiS)

1130 mL of cyclohexane, 2.8 mL of tetrahydrofurane and 20.4 grams of styrene were added to the polymerization reactor. Initial reaction temperature was set to 50° C. and 1.51 mmol of n-butyllithium in a cyclohexane solution were added as the polimerization initiator. The polymerization of styrene was left to proceed during 20 minutes. When the polystyrene block was completed, 151 mL of 1,3-butadiene (1.75 mol) were added to the reactor. The butadiene monomer was left to polymerize during 60 minutes. Once the pressure generated by the butadiene had descended, 3.5 mL (20.7 mmol) of 4-dimethylsilylstyrene and 17.0 grams of styrene were added to the reactor to form the final polymer block, which was left to react for 10 minutes. The living polymer chains were deactivated with the addition of the appropriate amount of BHT, as measured by online UV-Vis technique. A sample of the triblock polymer solution was precipitated in hot water and dried under vacuum during several hours. The resulting solid presented a Mp=90.240 in the GPC. The $^1$H-NMR spectrum of the copolymer presented the signal assigned to the silyl-hydride containing unit, with the methyl groups signal appearing at 0.35 ppm and the SiH group at 4.5 ppm. The composition of the product as calculated from $^1$H-NMR spectrum was 26.3% wt Styrene, 2.4% wt dimethylsilylstyrene. The styrenic block content (styrene and dimethylsilylstyrene) was 99.4% with respect to the total styrenic units in the copolymer, and the vinyl content was 36.5% with respect to the total butadiene. These results indicate a quantitative 4-dimethylsilylstyrene incorporation to the polymer, as well as triblock structure formation.

Example 3

Block Copolymer of 4-Dimethylsilylstyrene with Styrene and Butadiene by Linking Reaction to Obtain 4-Dimethylsilylstyrene in Both External Blocks (DMSiS/S)-b-BD-b-(S/DMSiS)

929 mL of cyclohexane, 4.1 mL of tetrahydrofuran, 36.9 grams of styrene and 1.0 mL of 4-dimethylsilylstyrene were added to the polymerization reactor. The reaction mixture was heated up to 50° C., and 4.52 mmol of n-butyllithium in a cyclohexane solution were added to initiate the polymerization. The monomer mixture was allowed to polymerize for 2 minutes and immediately afterwards, 151 mL of butadiene (1.76 mol) were added, allowing the polymerization to proceed for 12 minutes. The living polymer chains were deactivated with the addition of 1.36 mmol of dimethyldichlorosilane as a linking agent. The reaction of the lithium-initiated chains with the linking agent was allowed to proceed at the same temperature of 50° C. during 12 minutes. A sample of the poly-(styrene/4-dimethylsilylstyrene-block-butadiene) copolymer was taken after the polymerization step, was precipitated in hot water and the solid obtained was dried under vacuum at 80° C., presenting a Mp value of 45.880 and PDI of 1.26. The same procedure was carried out to obtain the final poly-(styrene/4-dimethylsilylstyrene-block-butadiene-block-styrene/4-dimethylsilylstyrene) linked product, obtaining a copolymer that was linked in a 95% extent, with Mp=90.450 and PDI of 1.41.

Example 4

Taper-Type Block Copolymer of 4-Dimethylsilylstyrene with Styrene and Butadiene 926 mL of cyclohexane, 0.5 mL of tetrahydrofurane, 22.0 gram of styrene, 3.1 mL of 4-dimethylsilylstyrene monomer and 140 mL of 1,3-butadiene (1.63 mol) were added to the polymerization reactor. The reaction temperature was set to 70° C., and the reaction time was set to zero with the addition of 1.49 mmol of n-butyllithium in a cyclohexane solution. The living polymer chains were deactivated after 60 minutes with the addition of the appropriate amount of BHT, as determined by the UV-Vis technique. The product solution in cyclohexane was precipitated in hot water, and the solid copolymer was dried under vacuum and 80° C. overnight. The product presented a molecular weight of Mp=85.336 as measured by GPC. The PDI of the sample was 1.56, and the microstructure calculated from the $^1$H-NMR spectrum of the polymer was the following: 20.65% wt of styrene and 2.2% wt of 4-dimethylsilylstyrene. The vinyl content related to the total butadiene content was 17.23%. The styrenic block content (styrene and dimethylsilylstyrene) was 30.5% with respect to the total styrenic units in the copolymer, indicating that the tapered or gradual structure of the polymerized monomers in the copolymer was obtained.

Example 5

Hydrogenated Block Copolymer of 4-Dimethylsilylstyrene with Styrene and Butadiene S-b-EB-b-(S/DMSiS)

The polymer obtained in Example 2 was subjected to hydrogenation of the dienic part, by means of heating to 90° C. the polymerization reactor which contained a 12% wt solution of the copolymer in cyclohexane and adding the hydrogenation catalyst described in EP0545844B1. This catalyst is essentially composed of a titanium based compound. The amount of hydrogenation catalyst added to the polymer solution was 0.25 mmol of Ti/100 g of butadiene. The reactor was then pressurized with 20 kg/cm² of hydrogen, and the hydrogenation process in presence of the catalyst was allowed to proceed during 30 minutes. After that, the hydrogenated polymer solution was precipitated in hot water and the solids obtained were dried under vacuum at 80° C. overnight. The hydrogenation process of the block copolymer obtained in Example 2 resulted in a silyl-hydride containing triblock polymer with 99.3% of the butadiene converted to saturated bonds. The quantitative hydrogenation of the polymer indicates that the incorporation of the silyl hydride containing monomer does not deactivate the hydrogenation catalyst. The $^1$H-NMR spectrum of the hydrogenated polymer presented the Si—H signals at 4.5 ppm originally present in the non-hydrogenated sample.

Example 6

Block Copolymer of 4-Dimethylsilylstyrene with Styrene and Butadiene Functionalized with Perfluoroalkyl Groups in Presence of Karstedt's Catalyst (DMSiS-F/S)-b-BD-b-(S/DMSiS-F)

A 12% wt solution in cyclohexane of a triblock copolymer of structure poly-(styrene/4-dimethylsilylstyrene-block-butadiene-block-styrene/4-dimethylsilylstyrene) prepared according to the procedure of Example 3 and containing 2.5% wt of polymerized 4-dimethylsilylstyrene in its structure was added to a 500 mL glass reactor. The reactor was dried, degassed and blanketed with nitrogen prior to the polymer solution addition. The polymer solution in cyclohexane was put in contact with 1 equivalent of perfluoro-1-octene with respect to the silyl hydride units present in the polymer. A hydrosilation catalyst containing platinum was also added (Karstedt's catalyst, 0.0108 mol of Pt/mol of silyl hydride). The mixture was allowed to react for 3.5 hours at 40° C. and the resulting perfluoroalkyl functionalized polymer was obtained by precipitation in water from the cyclohexane solution. Both the $^1$H-NMR and FTIR spectra of the functionalized product showed the complete disappearance of the silyl-hydride moiety signal, indicating complete functionalization.

Example 7

Hydrogenated Block Copolymer of 4-Dimethylsilylstyrene with Styrene and Butadiene Functionalized with Perfluoroalkyl Groups in Presence of Karstedt's Catalyst 150 mL of the hydrogenated polymer solution in cyclohexane obtained in Example 5 were put in contact with 1.1 mL of pure perfluoro-1-octene (CAS 25291-17-2, purchased from Aldrich) and 0.11 mL of a Karstedt's catalyst solution in xylenes (Platinum(0)-1,3-divinyl-1,1,3,3-tetramethyldisiloxane complex solution 2% Pt wt, CAS 68478-92-2, purchased from Aldrich). The mixture was left to react at 60° C. during 90 minutes under stirring and inert atmosphere. The resulting perfluoroalkyl functionalized polymer was obtained by precipitation in water from the cyclohexane solution. Both the $^1$H-NMR and FTIR spectra of the functionalized product showed the disappearance of 43% of the silyl-hydride moiety signal.

Example 8

Hydrogenated Block Copolymer of 4-Dimethylsilylstyrene with Styrene and Butadiene Functionalized with Amine Groups in Presence of Karstedt's Catalyst The hydrogenated triblock copolymer solution in cyclohexane obtained in Example 5 was subjected to a hydrosilylation process that consisted of the addition of the following substances at a temperature of 40° C.: 1.2 mL of pure allylamine (CAS 107-11-9, purchased from Aldrich) and 4.6 mL of a Karstedt's catalyst solution in xylenes (2.1% wt Pt, CAS 68478-92-2, purchased from Aldrich). The reactant and catalyst were left in contact with the polymer solution under stirring during 2 hours at 40° C. The resulting solid obtained after precipitation in water presented a complete disappearance of the $^1$H-NMR signal assigned to the silyl hydride group (at 4.5 ppm). The $^1$H-NMR signal corresponding to the methyl groups of the 4-dimethylsilylstyrene units, appearing in the original sample at 0.35 ppm, splitted into two different signals upon functionalization, which was interpreted as the addition of functionality to the silyl hydride position adjacent to methyl groups.

Example 9

Hydrogenated Block Copolymer of 4-Dimethylsilylstyrene with Styrene and Butadiene Functionalized with Hydroxyl Groups in Presence of Karstedt's Catalyst 150 mL of the hydrogenated triblock copolymer solution in cyclohexane obtained in Example 5 was subjected to a hydrosilylation process that consisted of the addition of the following substances at a temperature of 60° C.: 0.37 mL of pure allylalcohol (CAS 107-18-6, purchased from Aldrich) and 0.025 mL of a Karstedt's catalyst solution in xylenes (2.1% wt Pt, CAS 68478-92-2, purchased from Aldrich). The reactant and catalyst were left in contact with the polymer solution under stirring during 90 minutes at 60° C. The resulting solid obtained after precipitation in water presented a complete disappearance of the $^1$H-NMR signal assigned to the silyl hydride group (at 4.5 ppm). The $^1$H-NMR signal corresponding to the methyl groups of the 4-dimethylsilylstyrene units, appearing in the original sample at 0.35 ppm, was split into two different signals which was interpreted as the chemical reaction at the silyl hydride position adjacent to methyl groups. Moreover, a signal at 3.5 ppm assigned to the methylene hydrogens present in hydroxypropyl moieties reacted with the silyl hydride appeared. The quantification of the product signal indicated a functionalization degree of 100%.

Example 10

Hydrogenated Block Copolymer of 4-Dimethylsilylstyrene with Styrene and Butadiene Functionalized with Epoxy Groups in Presence of Karstedt's Catalyst 1000 mL of the hydrogenated triblock copolymer solution in cyclohexane obtained in Example 5 was subjected to a hydrosilylation process that consisted of the addition of the following substances at a temperature of 130° C.: 3.74 mL of 1,2-epoxy-5-hexene (CAS 10353-53-4, purchased from Aldrich) and 0.15 mL of a Karstedt's catalyst solution in xylenes (2.1% wt Pt, CAS 68478-92-2, purchased from Aldrich). The reactant and catalyst were left in contact with the polymer solution under stirring during 90 minutes at 130° C. The resulting solid obtained after precipitation in water presented a partial decrease of the 1H-NMR signal assigned to the silyl hydride group (at 4.5 ppm). The $^1$H-NMR signal corresponding to the methyl groups of the 4-dimethylsilylstyrene units, appearing in the original sample at 0.35 ppm, splitted into two different signals which was interpreted as the chemical reaction at the silyl hydride position adjacent to methyl groups. Moreover, two signals at 2.6 and 2.7 ppm assigned to the hydrogens of the oxirane ring, appeared. The quantification of the silyl hydride signal decrease, as well as the quantification of the oxirane signals in the functionalized product indicated a functionalization degree of 50%.

Example 11

Hydrogenated Block Copolymer of 4-Dimethylsilylstyrene with Styrene and Butadiene Functionalized with Hydroxyl Groups in Presence of $PtCl_2[(C_2H_5)_2S]_2$ Catalyst 150 mL of the hydrogenated triblock copolymer solution in cyclohexane obtained in Example 5 was subjected to a hydrosilylation process that consisted of the addition of the following substances at a temperature of 60° C.: 0.37 mL of pure allyl alcohol (CAS 107-18-6, purchased from Aldrich) and 0.025 mL of a platinum containing substance ($PtCl_2[(C_2H_5)_2S]_2$ CAS 15337-84-5, purchased from Johnson Matthey) dissolved in anhydrous THF to a concentration of 2% wt platinum. The reactant and catalyst were left in contact with the polymer solution under stirring and inert atmosphere during 90 minutes at 60° C. The resulting solid obtained after precipitation in water and drying presented a complete disappearance of the $^1$H-NMR signal assigned to the silyl hydride group (at 4.5 ppm). The $^1$H-NMR signal corresponding to the methyl groups of the 4-dimethylsilylstyrene units, appearing in the original sample at 0.35 ppm, was split into two different signals which was interpreted as the chemical reaction at the silyl hydride position adjacent to methyl groups. Moreover, a signal at 3.5 ppm assigned to the methylene hydrogens present in hydroxypropyl moieties reacted with the silyl hydride, appeared. The quantification of the product signal indicated a functionalization degree of 100%.

Example 12

Hydrogenated Block Copolymer of 4-Dimethylsilylstyrene with Styrene and Butadiene Functionalized with Epoxy Groups in Presence of $PtCl_2[(C_2H_5)_2S]_2$ Catalyst 150 mL of the hydrogenated triblock copolymer solution in cyclohexane obtained in Example 5 was subjected to a hydrosilylation process that consisted of the addition of the following substances at a temperature of 60° C.: 0.64 mL of 1,2-epoxy-5-hexene (CAS 10353-53-4, purchased from Aldrich) and 0.025 mL of a platinum containing substance ($PtCl_2[(C_2H_5)_2S]_2$ CAS 15337-84-5, purchased from Johnson Matthey) dissolved in anhydrous THF to a concentration of 2% wt platinum. The reactant and catalyst were left in contact with the polymer solution under stirring during 90 minutes at 60° C. The resulting solid obtained after precipitation in water presented a partial decrease of the $^1$H-NMR signal assigned to the silyl hydride group (at 4.5 ppm). The $^1$H-NMR signal corresponding to the methyl groups of the 4-dimethylsilylstyrene units, appearing in the original sample at 0.35 ppm, splitted into two different signals which was interpreted as the chemical reaction at the silyl hydride position adjacent to methyl groups. Moreover, two signals at 2.6 and 2.7 ppm assigned to the hydrogens of the oxirane ring, appeared. The quantification of the silyl hydride signal decrease, as well as the quantification of the oxirane signals in the functionalized product indicated a functionalization degree of 70%.

Example 13

Impact Properties of Mixtures of Hydrogenated and Functionalized Polymers and Polyamide Blends containing hydrogenated and functionalized samples according to the present invention were prepared by premixing them with nylon-6 (90 wt %) and antioxidant 1-1330 (0.2 wt %). The premixed samples were dried in a vacuum oven (15 h, 80° C.) before being compression molded at 230° C. to obtain plates for impact tests (80 mm×4 mm×10 mm). Specimens were subjected to impact tests: notched Izod and notched Charpy, according to normalized methods UNE-EN ISO 180:01 and UNE-EN ISO 179-1:2001, respectively.

Impact results shown in Table 1 exhibit a significant improvement of both Izod and Charpy impact at 23° C. and at −30° C., compared to the impact properties of neat nylon-6, and also compared to mixtures of unfunctionalized SEBS with nylon.

TABLE 1

| | \multicolumn{4}{c}{Impact properties of mixtures of functionalized SEBS and nylon} | | | |
|---|---|---|---|---|
| Blend or specimen | Notched Izod impact at 23° C. (kJ/m$^2$) | Notched Izod impact at −30° C. (kJ/m$^2$) | Notched Charpy impact at 23° C. (kJ/m$^2$) | Notched Charpy impact at −30° C. (kJ/m$^2$) |
| Neat nylon - 6 | 5.7 | 5.0 | 6.7 | 1.7 |
| Blend A (comparative) | 6 | 4 | 7 | 4 |
| Blend B | 12 | 10 | 16 | 8 |
| Blend C | 8 | 5 | 12 | 5 |

The polymer used in comparative Blend A was a hydrogenated, unfunctionalized sample of a styrene-butadiene-styrene (SEBS) triblock copolymer with molecular weight Mp=90.000 and hydrogenation degree of the dienic bonds of 99.5%.

The polymer used in Blend B was a hydrogenated sample analogous to the unfunctionalized SEBS, containing 12 equivalents of silyl hydride units before effecting functionalization. The silyl hydride units of this polymer were functionalized with allyl alcohol, following the procedure described in Example 9.

The polymer used in Blend C was a hydrogenated sample analogous to the unfunctionalized SEBS, containing 12 equivalents of silyl hydride units before effecting functionalization. The silyl hydride units of this polymer were functionalized with 1,2-epoxi-5-hexene, following the procedure described in Example 10.

Example 14

Hot-Melt Adhesive Formulations Using Hydrogenated and Functionalized Polymers Two different hot-melt adhesive formulations were prepared with several samples of hydrogenated and functionalized polymers of the invention, and also with a comparative, unfunctionalized sample of hydrogenated polymer.

The unfunctionalized sample of polymer (polymer 1) is a hydrogenated triblock copolymer of styrene and butadiene (SEBS) with molecular weight MP=90.000 and hydrogenation degree of the dienic bonds of 99.5% with respect to the total butadiene. The hydrogenated and functionalized samples of polymer (polymer 2 to 4) are analogous to polymer 1, and contained 12 equivalents of silyl hydride units before effecting functionalization. The results of the functionalization of each polymer sample are summarized in Table 2.

TABLE 2

Hydrogenated and functionalized polymers used in the adhesive formulations

| Hydrogenated and functionalized polymer samples | Functional group | Degree of functionalization (*) |
|---|---|---|
| polymer 2 | epoxy | 48 |
| polymer 3 | hydroxy | 42 |
| polymer 4 | perfluoroalkyl | 25 |

(*) defined as the percentage of functional groups incorporated with respect to the original silyl hydride groups present.

The two hot-melt adhesive formulations shown in Table 3 were prepared in a glass reactor at 180° C. under inert atmosphere, adding the oil in first place, followed by the antioxidant, the resin, and finally the polymer.

TABLE 3

Formulations used to prepare hot - melt adhesives

| Component | Description | Formulation 1 (phr) | Formulation 2 (phr) |
|---|---|---|---|
| Sample of polymer | Polymers 1 to 4 | 100 | 100 |
| Pioneer 2071P | naphtenic type oil | 150 | 162 |
| Regalite 1090 | hydrocarbonated cycloaliphatic resin | 200 | 430 |
| Irganox - 1010 | antioxidant | 1.5 | 3.1 | phr refers to parts per 100 of rubber (polymer)

The adhesives were applied to a Mylar film (PET) 0.002" thick at 165° C., and covered with silicon paper to avoid their contamination. Specimens were obtained from the films impregnated with the adhesives to determine Probe Tack, SAFT (shear adhesion failure time) and Peel resistance values.

The Probe Tack was determined on 2.5 cm by side specimens with a Digital Polyken Probe Tack Tester TMI 80-02-01 apparatus equipped with a 0.5 cm diameter stainless steel probe, according to method ASTM D 2979. The SAFT was carried out in a forced air circulation oven (Cheminstruments) at 48° C. and with 0.5 kg weights following the procedure of ASTM D 903. The measurement of Peel resistance values was performed with an Instron Tensometer model 4301, using as substrate aluminium panels 1 mm thick and following the procedure of ASTM D 1876. The viscosity was measured in a Brookfield Synchr-Letric Viscosimeter Nodel DV-II. The softening temperature was measured in an automated ring and ball softening point apparatus FP83 from Mettler following the procedure ASTM D E28.

The results in adhesive properties for Formulation 1 are shown in Table 4. Higher values of Probe Tack and SAFT values are obtained for the adhesive formulations prepared with the hydrogenated samples of polymer functionalized with hydroxyl and perfluoroalkyl groups, indicating better adhesive properties than for the formulation prepared with the unfunctionalized sample of polymer. Also, the softening temperature increases for these samples, facilitating the use of these compositions.

TABLE 4

Results of the assays of hot melt adhesives prepared using Formulation 1

| Polymer used in the formulation | Probe Tack (g) | SAFT (s) | Peel Resistance (kgf/cm) | T soft (° C.) | Brookfield viscosity at 180° C. (cP) |
|---|---|---|---|---|---|
| polymer 1 (comparative) | 720 | 217 | 345 | 127 | 3586 |
| polymer 2 | 776 | 270 | 179 | 144 | 27500 |
| polymer 3 | 623 | 143 | 179 | 146 | 64000 |
| polymer 4 | 817 | 268 | 244 | 156 | 34600 |

The use of any of the three hydrogenated and functionalized samples of polymer in Formulation 2 results in an increase of the Probe Tack value, as well as of the softening temperature with respect to the adhesive prepared with the hydrogenated and unfunctionalized (comparative) sample, as shown in Table 5.

TABLE 5

Results of the assays of hot melt adhesives prepared using Formulation 2

| Polymer used in the formulation | Probe Tack (g) | Peel Resistance (kgf/cm) | Tsoft (° C.) | Brookfield viscosity at 160° C. (cP) | Brookfield viscosity at 180° C. (cP) |
|---|---|---|---|---|---|
| polymer 1 (comparative) | 1246 | 2058 | 107 | 1473 | 660 |
| polymer 2 | 1602 | 1354 | 113 | 5556 | 2780 |
| polymer 3 | 1759 | 1736 | 121 | 14860 | 7440 |
| polymer 4 | 1723 | 1709 | 117 | 9800 | 5170 |

The invention claimed is:

1. A polymer obtained by a process which comprises the following steps:
   a) polymerization of at least one alkenyl aromatic monomer, at least one conjugated diene monomer, and at least one monomer containing at least one silyl hydride moiety;
   b) hydrogenation of the original dienic unsaturations of the polymer obtained in the previous step; and
   c) functionalization of some or all of the silyl hydride moieties available with one or more substrates having alkene or alkyne moieties via a hydrosilylation reaction in the presence of a catalyst;
   wherein the functionalization step c) is carried out either after or before the hydrogenation step b);
or
   a) polymerization of at least one alkenyl aromatic monomer, at least one conjugated diene monomer, and at least one monomer containing at least one silyl hydride moiety; and b) hydrogenation of the original dienic unsaturations of the polymer obtained in the previous step.

2. A polymer according to claim 1, wherein at least 50% of the original dienic unsaturations of the polymer are hydrogenated.

3. A polymer according to claim 1, having an average molecular weight M(p) at the peak of the distribution of between 1,000 g/mol and 1,000,000 g/mol.

4. A polymer according to claim 1, wherein the at least one alkenyl aromatic monomer is selected from the group consisting of:
styrene, vinylpyridine, vinylnaphthalene, and 1,2-diphenyl-4-methylhexene, these alkenyl aromatic monomers being optionally substituted with alkyl, cycloalkyl, aryl, and/or alkylaryl,
and/or optionally containing at least a Si—C bond, at least a Si—O—C bond, at least a Si—O—Si bond, at least a Si—N bond and/or at least a Si—Si bond;
and mixtures thereof.

5. A polymer according to claim 4, wherein the at least one alkenyl aromatic monomer is selected from the group consisting of:
alpha-methylstyrene, vinyltoluene, 3-methylstyrene, 3,5-diethylstyrene, 2-ethyl-4-benzylstyrene, 4-phenylstyrene, 4-p-tolylstyrene, 4-(tert-butyl)-styrene, 2,4-divinyltoluene, 1-alpha-methylvinylnaphthalene, 2-alpha-methylvinylnaphthalene, and 4,5-dimethyl-1-vinylnaphthalene, 4-(trimethylsilyl)styrene, 4-(vinyldimethylsilyl)-styrene, 4-(dimethylmethoxysilyl)styrene, 4-[(trimethylsilyloxy)dimethylsilyl]styrene, 4-[(N,N-diethylamino)-dimethylsilyl]styrene, 4-(allyldimethyl-silyl)dimethylsilyl-methylstyrene, and mixtures thereof.

6. A polymer according to claim 1, wherein the at least one conjugated diene monomer is selected from the group consisting of 1,3-butadiene, isoprene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, 2-methyl-3-isopropyl-1,3-butadiene, and myrcene;
and mixtures thereof.

7. A polymer according to claim 1, wherein at least one monomer containing at least one silyl hydride moiety is selected from the group consisting of:
alkenyl aromatic monomers having silyl hydride units;
diene monomers having silyl hydride units;
dialkylvinylsilanes, silyl-substituted acrylates and methacrylates, cyclic siloxanes;
and mixtures thereof.

8. A polymer according to claim 7, wherein the at least one monomer containing at least one silyl hydride moiety is selected from the group consisting of:
dialkylsilylstyrenes, dialkylsilylalkylstyrenes, 1,3-butadien-1-yldimethyl-silane;
and mixtures thereof.

9. A polymer according to claim 1, wherein:
the alkenyl aromatic monomer is styrene (S),
the conjugated diene monomer is butadiene (B) and/or isoprene (I), and
the monomer containing at least one silyl hydride moiety is 4-dimethylsilylstyrene (DMSiS),
said monomers being present in any monomer sequence.

10. A polymer according to claim 1, wherein the polymer obtained in the polymerization step a) is a block copolymer selected from the group consisting of S-DMSiS-B, S-DMSiS-I, (S-DMSiS-B)$_m$S (wherein m is a whole number), S-DMSiS-B-S, S-DMSiS-I-S, B-S-DMSiS-B, I-S-DMSiS-I, and copolymers in which at least one of the blocks has a random or tapered structure.

11. A polymer according to claim 1, fulfilling at least one of the following provisions:
the molar proportion of the alkenyl aromatic monomer with respect to the conjugated diene monomer ranges from about 0.1 to about 1.0;
the molar proportion of the silyl hydride containing monomer with respect to the conjugated diene monomer ranges from about 0.1 to about 1.0;
the molar proportion of alkenyl aromatic monomer and silyl hydride containing monomer with respect to conjugated diene monomer ranges from about 0.05 to about 1.0.

12. A polymer according to claim 1, wherein the hydrosilylation step c) is effected:
in solution in the same reactor and solvent used to carry out the polymerization step a) and/or the hydrogenation step b); or
in an extruder or other mixing apparatus by adding the substrate(s) having alkene or alkyne moieties and the catalyst to the polymer obtained in the hydrogenation step b).

13. A segmented, branched, comb or graft material obtained by the reaction of:
a polymer obtained by a process which comprises a polymerization step a) and an hydrogenation step b) as defined in claim 1 with one or more polymers having C=C and/or C≡C bonds; or
a polymer obtained by a process which comprises a polymerization step a), an hydrogenation step b) and an hydrosilylation step c) as defined in claim 1 with other monomers, polymers or substrates having complementary functionalities.

14. A material comprising a polymer as defined in claim 1, said material being selected from the group consisting of:
an adhesive composition such as hot-melt adhesives, solvent-born adhesives, reactive adhesives;
a sealant composition;
a coating composition;
a reinforced material or a composite material;
a modified asphalt composition;
a modified plastic material;
fibers of polymer;
a nanomaterial;
a cable composition;
a medical tubing;
a tie layer composition; and
an overmolding composition.

15. A process for preparing a polymer which comprises the following steps:
a) polymerization of at least one alkenyl aromatic monomer, at least one conjugated diene monomer, and at least one monomer containing at least one silyl hydride moiety;
b) hydrogenation of the original dienic unsaturations of the polymer obtained in the previous step; and
c) functionalization of some or all of the silyl hydride moieties available with one or more substrates having alkene or alkyne moieties via a hydrosilylation reaction in the presence of a catalyst;

wherein the functionalization step c) is carried out either after or before the hydrogenation step b);

or a) polymerization of at least one alkenyl aromatic monomer, at least one conjugated diene monomer, and at least one monomer containing at least one silyl hydride moiety; and b) hydrogenation of the original dienic unsaturations of the polymer obtained in the previous step.

* * * * *